March 26, 1963  O. H. SCHELDORF  3,082,512
COMPRESSOR VALVE ASSEMBLY
Filed May 16, 1960

INVENTOR.
OWEN H. SCHELDORF
BY
HIS ATTORNEY

United States Patent Office 3,082,512
Patented Mar. 26, 1963

3,082,512
COMPRESSOR VALVE ASSEMBLY
Owen H. Scheldorf, Fern Creek, Ky., assignor to General Electric Company, a corporation of New York
Filed May 16, 1960, Ser. No. 29,374
2 Claims. (Cl. 29—156.7)

The present invention relates to compressor valve assemblies and is more particularly concerned with an improved method of making such an assembly.

Small high speed compressors such as those employed in the refrigeration industry generally include flexible, pressure-actuated valves as such valves have been found to be most efficient for high speed operation. Such valves frequently consist of flexible, thin discs of metal supported at their centers on a valve plate with the peripheral edge portion of the disc overlying and normally closing one or more gas ports or openings in the plate. In order to limit flexing of the valve, a valve backing or retaining member is also provided. Because of the space limitations, such valve assemblies usually comprise a single fastening means extending centrally through the plate, the disc valve and the backing member for securing the three in operative position relative to one another.

In the manufacture of such compressors where the valve disc is relatively small, having, for example, a diameter in the neighborhood of one inch, riveting is a more economical method of making the valve assembly than screwing or bolting. The usual riveting technique comprises inserting a heated rivet through the openings provided in the valve plate, the disc valve and the valve backing member, or heating such a rivet to suitable plastic flow temperatures after insertion thereof, and thereafter squeezing or hammering the rivet while hot to form a mechanical joint between the components of the assembly. In the mass manufacture of compressors including valve assemblies which have been hot riveted, in has been found that there may be a widespread variation of capacities of the final products even though the parts are identical or interchangeable. The present invention is based on the discovery that even though the physical dimensions of the components of the valve assembly may be great enough to resist apparent distortion, similar parts when assembled will vary considerably and unpredictably in their characteristics. These unpredictable variations appear to result to a large extent from the techniques that have been employed in manufacturing the valve assemblies. Since the space or clearance between the rivet and the other valve components must be small for proper location of the components, it appears that the amount of heat employed for the usual "hot-riveting" of the parts softens the hardened valve plate and disc valve and distorts these parts as much as cold riveting where the forces required for forming the rivet are excessive. A further requirement involved in making such an assembly is that the joining operation provide a leak proof joint since the riveted joint constitutes an area separating a high pressure zone on one side of the valve assembly from a low pressure zone on the other size of the assembly. Hence the riveting operation must not only provide a distortion free assembly but also one which is gas tight.

The present invention has as its principal object the manufacture of a valve assembly which is both leak proof and significantly free of the distortion problems encountered in the usual hot-riveting of such an assembly.

Another object of the invention is to provide an improved method for manufacturing a valve assembly whereby such assemblies can be mass produced with minimum variations in the operating characteristics thereof.

Further objects and advantages of the present invention will become apparent as the following description proceeds and the features of novelty which characterize the invention will be pointed out with particularity in the claims annexed to and forming part of this specification.

In accomplishing the objects of the present invention, a valve plate member, a disc valve member and a valve backing member of a particular design are mechanically joined by means of a special rivet and riveting technique which provides a leak proof riveted joint between the three members with the minimum distortion thereof. To this end, the valve backing member is provided with a rivet receiving opening which forms a relatively sharp edge with the adjacent surface of the valve backing member at the point where the rivet is headed or deformed for the joining operation. More particularly it has been found that in order to accomplish the desired gas tight seal, the maximum allowable radius of this edge is of the order of about 0.005 inch. In addition, there is employed a rivet having a preformed head portion for engaging the valve plate and a hollow or tubular end portion adapted to be headed or formed into engagement with the valve backing member while the heading operation is conducted in such a manner that only the tubular or hollow end portion of the rivet is warmed or heated to plastic flow conditions during the heading operation.

For a better understanding of the invention reference may be had to the accompanying drawing in which.

Figure 1:
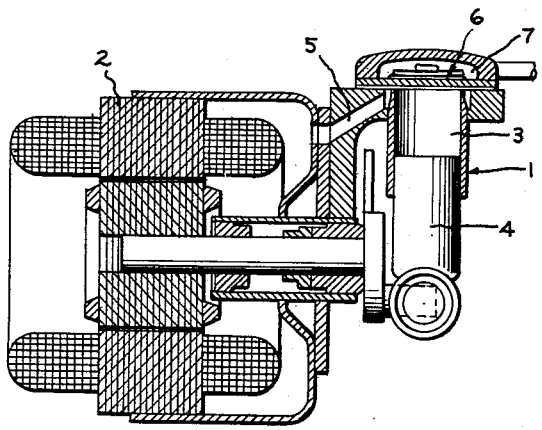
FIG. 1 is an elevation view, in section, of a high speed motor driven compressor unit to which the present invention is particularly adapted.

With reference to the drawing there is shown a fractional horsepower refrigerant compressor 1 adapted to be driven by a motor 2, the compressor comprising a cylinder 3 and a piston 4 which is connected to the motor for reciprocal movement within the cylinder. During operation of the compressor refrigerant gas is drawn into the compressor cylinder 3 through an intake port 5 and is discharged through a discharge valve assembly generally indicated by the numeral 6 into a head 7.

While the present invention is applicable to either intake or discharge valve assemblies for small compressors, it will be particularly described with reference to the discharge valve assembly 6 which, as is more clearly shown in FIG. 2 of the drawing, comprises a valve plate member 8 having a plurality of annularly arranged ports 9, a flexible disc valve member 10 having a peripheral edge portion overlying these ports and a valve backing member 11. For proper operation, these members must be secured together with the backing member 11 retaining the disc valve 10 in contact with the valve plate 8 and having a slightly curved surface or face 14 overlying the disc valve 10 to permit the unsupported radius of the disc valve 10 to flex between its valve port closing position and an open position. The disc valve may be made of suitable spring steel while the valve plate 8 is composed of a hardened steel in order to resist the stresses imposed thereon during operation of the compressor.

For the purpose of assembling the valve assembly components in operative position they are respectively provided with rivet receiving openings 15, 16 and 17 which in the case of the disc valve member and the valve backing member are centrally positioned therein. A rivet 19 is provided for insertion through the openings 15, 16 and 17 to secure the members 8, 10 and 11 together. In accordance with the present invention the rivet employed for this purpose comprises a head portion 20 adapted to engage the valve plate 8 which may have a recess 21 for receiving this head in order to limit the amount of clearance necessary between the valve assembly and the piston 4. This rivet 19 also includes a shank portion 22 which extends through the openings 15, 16 and 17 in the valve members and is of a diameter such that while these members will be held in their proper positions during the assembly operation, heat conduction from the rivet to these members will be held to a minimum during the rivet forming operation. To this end the clearances between the rivet and the walls defining the openings 15, 16 and 17 may be of the order of .002 inch.

Figure 2:
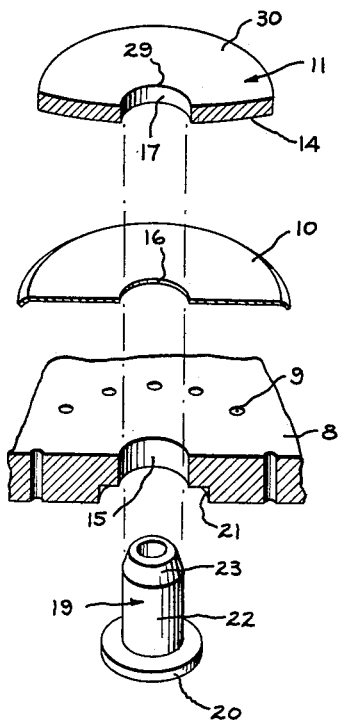
FIG. 2 is an exploded view illustrating one step in the method of manufacturing a valve assembly for the compressor of FIG. 1.

In order to further limit the heating of members 8, 10 and 11 during the riveting operation, the end 23 of the rivet which is to be headed is hollow as indicated in FIG. 2 and is also provided with a chamfered edge for the purpose of limiting the cross sectional area of the rivet in these portions so that by pasing a current therethrough the end 23 it will reach a more elevated temperature in a shorter period of time than the head 20 of the rivet. In other words, by this construction of the rivet, the heading end 23 of the rivet presents a greater resistance to the flow of electric current therethrough with the result that it is quickly heated to a plastic or red heat temperature at which it can be readily deformed into engagement with the adjacent surfaces of the valve backing member 11.

Figure 3:
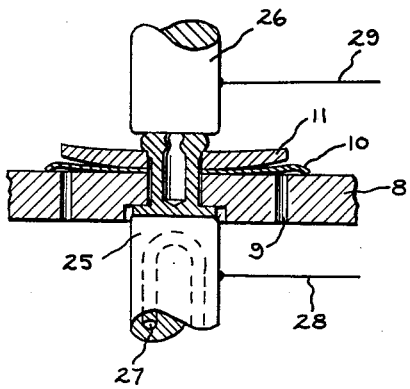
FIG. 3 is an enlarged sectional view illustrating the heading step in the manufacture of the valve assembly.

The heating and forming operation which is illustrated in FIG. 3 of the drawing comprises placing the assembly including the valve plate 8, the disc valve 10 and the valve backing member 11 with the rivet 19 extending through the openings therein between two clamping electrodes 25 and 26 which are adapted to engage the opposite ends of the rivet and to apply thereto sufficient pressure so that the portion of the heading end 23 of the rivet is brought up to a red heat, this portion will be suitably formed or forged into engagement with the valve backing member 11. Preferably the electrode 25 engaging the head 20 of the rivet is cooled for example by passing a cooling fluid through suitable passages 27 provided in this electrode so that when a current is passed between the electrodes from supply conductors 28 and 29 the electrode 25 and hence the adjacent portions of the valve assembly will be maintained at a relatively low temperature by the cooling effect of the cooling fluid as well as its lower electrical resistance resulting from larger cross sectional areas of the rivet 20 at these points. As a result the heating of the rivet to deformation temperatures is largely restricted to the heading end 23 and when the temperature of this end of the rivet is sufficient to be deformed by the pressures applied thereto by the electrode 26, this end of the rivet will be headed over into engagement with the valve assembly as indicated in FIG. 3.

As has been previously indicated, it has also been found that a gas tight seal between the rivet and the remaining components of the valve assembly is obtained if the edge 29 defined by the outer surface or opposite face 30 of the valve backing member 11 and the rivet receiving aperture or opening 17 is as sharp as possible and preferably has a radius of curvature which does not exceed about .005 inch. Presumably by employing a backing member having such an edge configuration, the hot rivet metal will flow against the edge and create small but effective close-to-weld type of annular joint which is completely leak proof.

Since only the chamfered end 23 of the rivet and the portions of the rivet adjacent thereto become plastic during the resistance heating operation substantially all of the deformation of the rivet is restricted to this area, the remaining body portion of the rivet between the head 20 and the chamfered end 23 becoming only sufficiently warm so that upon the ultimate cooling thereof, its shrinkage will increase the tightness of the joint between the rivet and the valve members but will not affect the hardness of those members. Furthermore, since the heating of the rivet to plastic temperatures is restricted to the end 23, the remaining portions of the rivet will not flow to such an extent under the applied forces as to distort or misalign the assembly members. In other words, the relatively cool portions of the rivet maintain the desired alignment of the plate 8, the disc valve 10 and the backing member 11 to provide the desired clearance between the backing member 11 and the disc valve 10 and other dimensions required for the designed operation of the valve assembly.

By the above described process, an assembly of the valve members is obtained with minimum distortion and maximum tightness. As the rivet fits loosely in the assembled members prior to the heating thereof, in the sense of heat transmission to the adjacent assembly members, the rivet can be resistance heated without a substantial loss of heat to the valve members. Further, as a result of the shape of the rivet, the heating of the rivet is different in three different areas or portions thereof to accomplish the desired purposes. The portion in contact with the disc valve and the valve plate remain cool both due to the fact that this portion provides less resistance to the flow current and also because of the cooling effect of the cooled electrode 25. That portion on the heading end of the rivet has the highest resistance so that the plastic or flow range is reached in the shortest possible time. The hollow tubular construction of the rivet in this area and the chamfer at the point or end of the rivet accomplishes this fast "heading" condition. The portions of the rivet intermediate the two ends is warmed to some extent so that during the subsequent cooling of the rivet the shrinkage of this warmed portion aids in obtaining a tight assembly. To obtain the leak proof characteristics of the joint between the rivet and the remaining components of the assembly, it has been found that rivets of steel or other hard metals should be employed as distinguished from aluminum or softer metal rivets.

While there has been shown and described a specific embodiment of the present invention, it is to be understood that the invention is not limited to the particular embodiment of the valve assembly shown and it is intended by the appended claims to cover all modifications within the spirit and scope of the invention.

What I claim as new and desire to secure by Letters Patent of the United States is:

1. The method of forming a valve assembly including a valve plate member having a face and a port opening into said face, a flexible valve member disposed on said face and overlying said port, and a valve backing member overlying said valve which comprises providing each of said members with a rivet-receiving opening, assembling said members with said backing member having one face in contact with said flexible valve member and having an opposite face disposed away from said valve member, said opening in said backing member defining a sharp peripheral edge of a radius not exceeding 0.005 inch with said opposite face of said backing member, inserting a rivet having a head and a hollow end portion through said openings with said head portion contacting said plate member and the hollow end thereof extending beyond said backing member, applying a deforming pressure to said rivet and resistance heating said end portion of said rivet to a deformation temperature while maintaining the remaining portions of said rivet relatively cool to deform said end portion into engagement with said sharp edge of said backing member to thereby provide a leakproof joint between said rivet and said edge.

2. The method of forming a valve assembly including valve plate member having a face and a port opening into said face, a flexible valve member disposed on said face and overlying said port, and a valve backing member overlying said valve which comprises forming each of said members with a rivet-receiving opening, assembling said members with said backing member having one face in contact with said flexible valve member and having an opposite face disposed away from said valve member, said opening in said backing member being formed to define a sharp peripheral edge of a radius not exceeding 0.005 inch with said opposite face of said backing member, inserting a rivet having a head and a hollow end portion through said openings with said head portion contacting said plate member and the hollow end thereof extending beyond said backing member, applying a deforming pressure to said end portion of said rivet and passing an electric current through said rivet to heat said hollow end portion of said rivet to a plastic temperature while maintaining the remaining portions of said rivet relatively cool whereby said end portion is deformed into gas tight engagement with said sharp edge of said backing member.

References Cited in the file of this patent
UNITED STATES PATENTS

| | | |
|---|---|---|
| 1,587,445 | Thomson | June 1, 1929 |
| 1,934,780 | Van Halteren | Nov. 19, 1933 |
| 2,106,775 | Trask | Feb. 1, 1938 |
| 2,609,660 | Tenney | Sept. 9, 1952 |
| 2,622,792 | Ramclow | Dec. 23, 1952 |
| 2,737,201 | St. Clair et al. | Mar. 6, 1956 |